United States Patent [19]

Tetrick et al.

[11] Patent Number: 4,675,746
[45] Date of Patent: Jun. 23, 1987

[54] SYSTEM FOR FORMING PICTURE, ALPHANUMERIC AND MICROGRAPHIC IMAGES ON THE SURFACE OF A PLASTIC CARD

[75] Inventors: Kenneth H. Tetrick, Minneapolis; Randall L. McCoy, St. Paul, both of Minn.

[73] Assignee: Data Card Corporation, Minnetonka, Minn.

[21] Appl. No.: 880,108

[22] Filed: Jun. 30, 1986

Related U.S. Application Data

[63] Continuation of Ser. No. 516,485, Jul. 22, 1983, abandoned.

[51] Int. Cl.⁴ .................... H04N 1/21; H04N 1/23; G01D 15/14
[52] U.S. Cl. .................... 358/296; 358/302; 346/160
[58] Field of Search .................... 346/108, 153.1, 160; 358/296, 300, 302

[56] References Cited

U.S. PATENT DOCUMENTS

| | | | |
|---|---|---|---|
| 3,343,142 | 9/1967 | Clark | 355/6 |
| 4,026,642 | 5/1977 | Tanaka et al. | 358/300 X |
| 4,316,199 | 2/1982 | Greenig et al. | 346/160 |
| 4,435,723 | 3/1984 | Seimiya et al. | 358/300 X |
| 4,467,335 | 8/1984 | Schmidt et al. | 346/160 |

Primary Examiner—E. A. Goldberg
Assistant Examiner—Patrick W. Foster
Attorney, Agent, or Firm—Faegre & Benson

[57] ABSTRACT

A system for forming an image on the outer surface of a plastic card and for correlating image data with corresponding alphanumeric data, comprises a data acquisition subsystem shown in FIG. 1, an encoder shown in FIG. 2, an exposure station for scanning an electrophotographic medium in accordance with digital image data generated by the data acquisition system, and a toning station for toning the electrophotographic medium to produce a toner image. The encoder forms identifying information corresponding to the alphanumeric data on the card and provides the encoded card to an image transfer station. At the image transfer station, the toner image on the electrophotographic medium is transferred to a portion of the card through heat and pressure. A protective layer is placed over the fused toner image.

12 Claims, 18 Drawing Figures

SYSTEM FOR FORMING PICTURE, ALPHANUMERIC AND MICROGRAPHIC IMAGES ON THE SURFACE OF A PLASTIC CARD

REFERENCE TO CO-PENDING APPLICATION

This application is a continuation of pending application Ser. No. 06/516,485 filed July 22, 1983, abandoned as of the filing date of the present application.

BACKGROUND OF THE INVENTION

1. Field of the Invention

This invention relates to a system for forming picture, alphanumeric and micrographic images on the outer surface of a plastic card.

2. Description of the Prior Art

There exist, in the prior art, systems for laminating over photographs placed in a cut-out in the inner core stock of a plastic card, and systems for laminating over an electrophotographic or printed image on the inner core stock of a card. Such prior art lamination systems require a separate image forming procedure in which a photograph is physically placed in the card (or an image is printed on the inner core of the card) and laminated. In addition, such systems do not make use of conventional plastic cards since they require the core stock to be exposed to receive an image, and subsequently laminated, resulting in a requirement to use expensive cards. Such prior art lamination systems slow down the through-put of the plastic cards when carried out in conjunction with embossing and/or encoding of the plastic cards. Finally, since the cost of each individual photograph is relatively high, these lamination systems are not particularly suitable for high volume applications.

One other prior art system for forming images on plastic cards is a system in which a silk screened ink patch is placed on the surface of a plastic card and an image is etched on the silk screened ink patch using an electronically actuated mechanical scribe. As in the case of the prior art lamination systems, such scribing systems do not have the capability of correlating image data and alphanumeric data for placement of corresponding indicia on a single plastic card. In addition, the scribing system is relatively slow, making it unacceptable in an overall system in which encoding or other steps are also to be performed. Further, since it is ncessary to provide a silk screened ink patch on each card, it is not possible to use conventional plastic cards, thereby resulting in an increased cost per card. Finally, the grooves which are present in scribed images are susceptible to the collection of dirt in a wallet environment, thereby resulting in a relatively non-durable card.

There is therefore a need in the industry for a system which is capable of correlating image data and corresponding alphanumeric data, forming an image on a card in accordance with the image data, and encoding the card in accordance with the alphanumeric data. Furthermore, there is a need for such a system in which the image is formed on the outer surface of a conventional plastic credit card in sequence with the encoding of the card. There is a further need for such a system which forms a card having an image which is durable in that it is resistant to wear, abrasion, and the chemicals present in a wallet environment. In addition, there is a need for such a card forming system in which the time for forming the image on the plastic card is approximately the same as or less than the times required for encoding a magnetic stripe or other information directly on the card. There is also a need for a card forming system where the graphic images are applied to the card in less than the time that would be required to utilize state of the art techniques to emboss the card. Finally, there is a need for a system for forming an image on a card wherein the cost per image is sufficiently low, and wherein a high resolution image is obtained.

SUMMARY OF THE INVENTION

The system of the present invention has a number of novel features as set forth below. An image is digitized and stored in semi-permanent storage together with corresponding alphanumeric data representing, for example, indicia to be encoded on a card. When the image is to be formed on a conventional plastic card, the digital image data is read from the semi-permanent storage and is input to an acousto-optic modulator. The acousto-optic modulator modulates a coherent light beam in accordance with the digital image data and the modulated coherent light beam is scanned across a charged electrophotographic medium, thereby producing a latent electrostatic image (corresponding to the image to be formed on the card) on the electrophotographic medium. The electrophotographic medium is transported past a toning station and a toner image (corresponding to the latent electrostatic image) is formed on the electrophotographic medium. The toner image is positioned adjacent a card to which the image is to be transferred and the electrophotographic medium is then pressed against the card with a heated platen having a curved contact surface so as to transfer the toner image to the card through heat and pressure. The electrophotographic medium is then released from the toner image so that the fused toner image remains on the card. A plastic overlay may then be applied to provide additional protection for the image, or for the entire surface of the card, if desired.

One of the significant advantages of the system of the present invention over the prior art is that conventional plastic cards may be used, so that cheaper readily available unprocessed plastic cards may be employed. In addition, the system of the present invention does not slow down the throughput of the plastic card manufacturing process since the time for forming the image on the card is comparable to the time required for encoding and other operations. Further, in the system of the present invention, the storage of digital data comprising image data and corresponding alphanumeric data, allows for simple and accurate processing of all of the information which must be provided for each cardholder.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Data Acquisition Terminal

Figure 1:
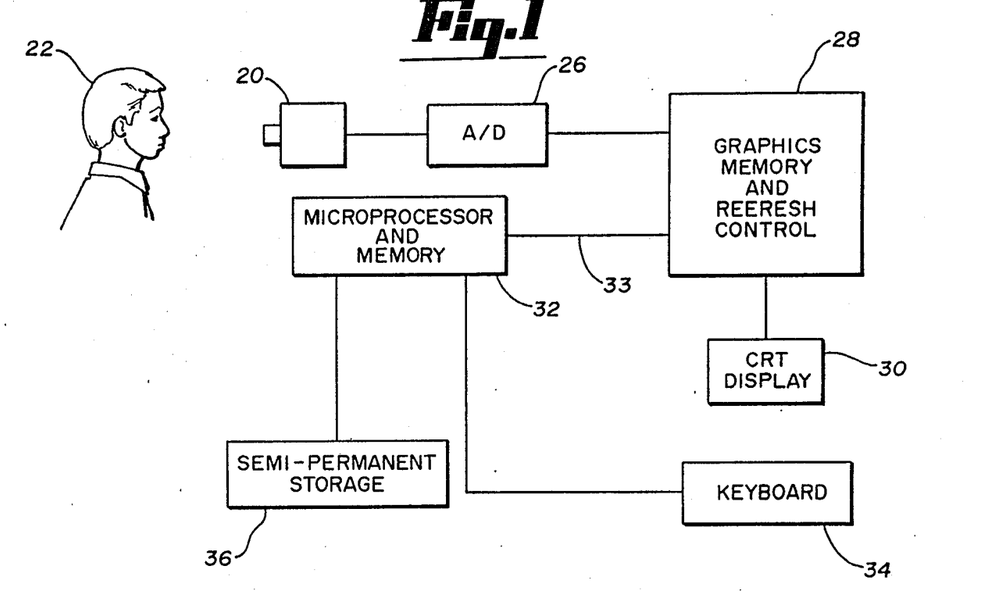
FIG. 1 is a block diagram of a data acquisition subsystem, including a circuit for acquiring and storing image data and alphanumeric identification data, in accordance with the present invention.

FIG. 1 illustrates the data acquisition subsystem of the present invention. A video camera 20 is employed to take a picture of a subject or cardholder 22 for whom a card 24 is to be formed. In the preferred embodiment, the video camera is the RCA Model No. 2055 Vidicon camera which is a source of a live video picture. The card 24 which is to be generated for each cardholder 22 may be, for example, a plastic credit card, a driver's license, or any other type of identification card. For convenience, reference is made hereinafter to a "card" 24.

A video digitizer 26 receives an analog image signal from the camera 20 and generates a digital image signal, wherein each digital word represents a gray scale level of a small portion or pixel of the image. A pixel is an 8×8 matrix of 0.001" squares. A graphics memory and refresh control circuit 28 receives the digital image signal from the video digitizer 26 and generates an analog video signal for a CRT display 30 which displays an image of the subject 22. The graphics memory and refresh control circuit 28 is also connected to a microprocessor and memory circuit 32 for transmitting and receiving the digital data signal along a bi-directional data bus 33 and for receiving an address signal as well as input/output read and write signals. The microprocessor and memory 32 may be connected to a remote computer or microprocessor via a standard RS-232C link. A keyboard 34 is also connected to the microprocessor and memory 32 so that alphanumeric data (e.g., name and address information, account information, encoding information, and other identifying information) can be input to the microprocessor and memory 32. This alphanumeric data is correlated with the corresponding digital image data and temporarily stored in the graphics memory and refresh control circuit 28 and displayed on CRT display 30. The microprocessor and memory 32 is also connected to semi-permanent storage 36 so that the alphanumeric and digital image data which is temporarily stored in the graphics memory and refresh control circuit 28 may be output to the semi-permanent storage 36 for later retrieval.

Figure 2:
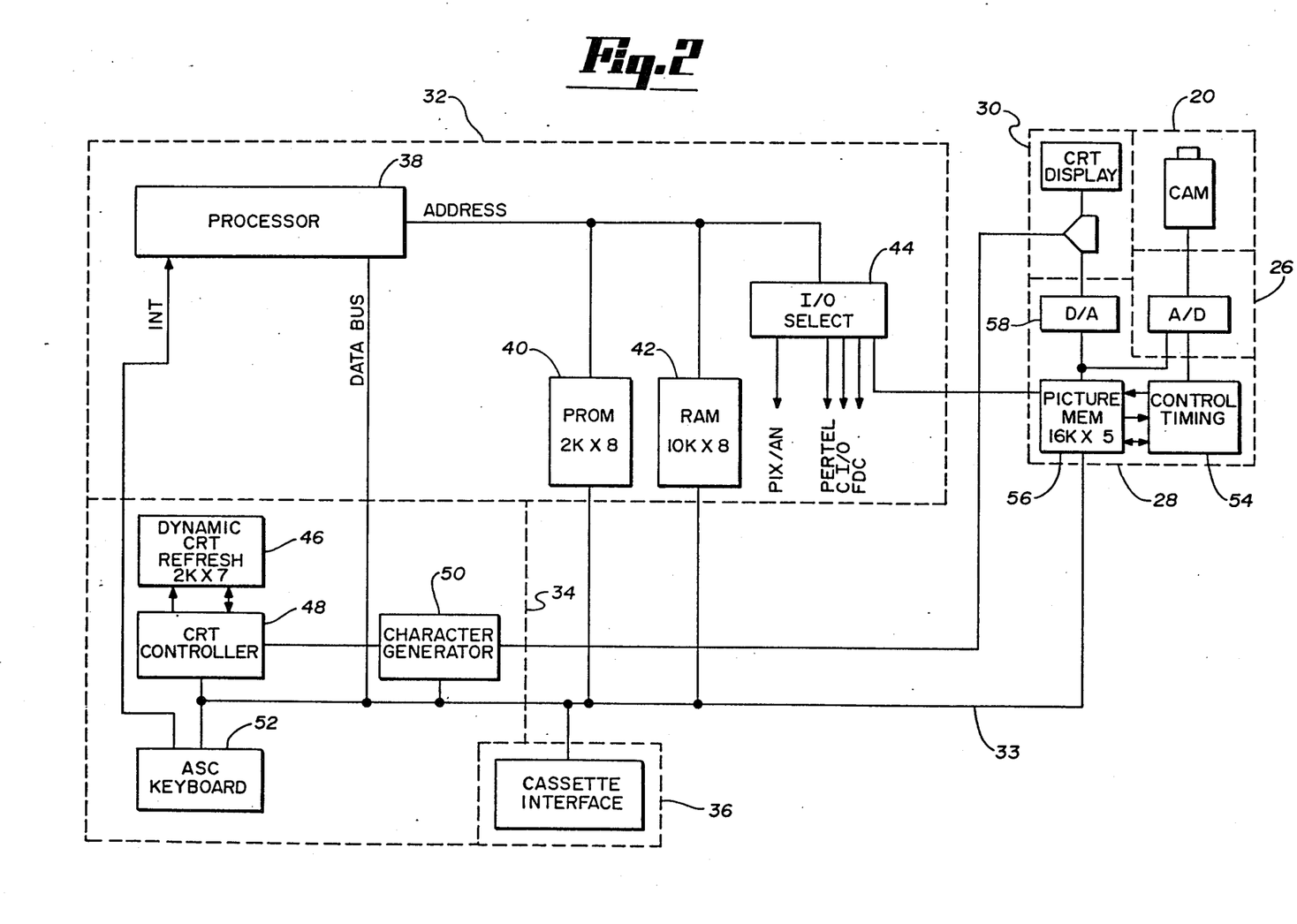
FIG. 2 is a block diagram illustrating the details of the data acquisition subsystem of FIG. 1.

The data acquisition subsystem of FIG. 1 will be described in detail with reference to FIG. 2. The microprocessor and memory 32 controls the operation of the data acquisition subsystem and includes a processor 38, a PROM (programmable read only memory) 40, a RAM (random access memory) 42 and an input/output selection circuit 44. The PROM 40 stores the control program for the processor 38. The RAM 42 provides temporary storage for the digital picture data and alphanumeric data during transfer of data to the semi-permanent storage 36. The I/O selection circuit 44 controls the input and output of data to and from the microprocessor and memory 32. The keyboard 34 comprises an alphanumeric refresh memory 46, a CRT controller 48, a character (dot) generator 50 and keyborad switches 52. When one of the keyboard switches 52 is depressed, the central processor 38 is interrupted and the processor 38 reads the ASCII character from the keyboard 34 and stores it in the ram 42. The character generator 50 decodes the keyboard character and sends a dot pattern, corresponding to the one of the keyboard switches 52 which has been depressed, to the CRT controller 48. This dot pattern is stored in the alphanumeric refresh memory 46 and the CRT display 30 continuously displays the dot pattern until the alphanumeric refresh memory 46 is altered or cleared.

The video camera 20 and video digitizer 26 capture a live field of video from the camera within at least 1/30th of a second. In the preferred embodiment, the video digitizer 26 is a fully parallel (flash) analog-to-digital (A/D) converter.

The graphics memory and refresh control circuit 28 includes a control timing circuit 54, a picture memory 56 and a digital-to-analog converter 58. The control timing circuit 54 samples the output of the video digitizer 26 at a rate which will yield a one-to-one aspect ratio. The sampled data is stored in the picture memory 56 and is used to refresh the CRT display 30 which displays the picture. The video camera 20 provides horizontal and vertical synchronization pulses for aligning the image displayed on the CRT display 30 with what the camera views. After the vertical retrace interval of the video camera 20, the control timing circuit 54 initializes the picture memory 56 to begin storing new camera data. After a picture has been completely stored in the picture memory 56, the last digitized field of camera video is "frozen" in the picture memory 56 and may then be accessed by the microprocessor and memory 32 which receives the stored picture. The microprocessor and memory 32 performs various processing routines to improve the quality of the image. In addition, the picture is compressed to reduce the amount of data necessary to represent the picture to be stored on the semi-permanent storage 36.

Alphanumeric data which may be input via the keyboard 34 may be correlated with the digital picture data received from the picture memory 56 in the RAM 42. Correlated alphanumeric data and digital image data are temporarily stored in the RAM 42 and the digital words representing the image data are placed in specific memory locations representing the location of the pixel whose gray level is the content of that memory element. Thus, the image is digitized so that the gray level in each discrete picture element is stored in memory locations representing the actual location in the visual image. The corresponding alphanumeric data is stored in adjacent memory locations to identify the images corresponding to the data. By using the keyboard 34, it is also possible to superimpose alphanumeric data on the image on the CRT display 30. In this case, the image data which is stored will correspond to the combined image (picture plus alphanumeric data) which is generated on the CRT display 30. Thus, a convenient check on the correspondence between the alphanumeric data which is formed on the card and the image which is formed on the card may be made. While it is possible to emboss the alphanumeric information on the card in a machine using state of the art embossing techniques, in the preferred embodiment of the system, the alphanumeric information is formed on the card in exactly the same manner that the image is applied.

Once the correlated alphanumeric and digital image data have been stored in the RAM 42, the central processor 38 outputs the stored data on the bi-directional data bus 33 to the semi-permanent storage 36. In the preferred embodiment, the semi-permanent storage 36 includes a cassette interface and a magnetic tape cassette on which digital data is stored during the data acquisition phase of the present system.

Figures 5, 6:
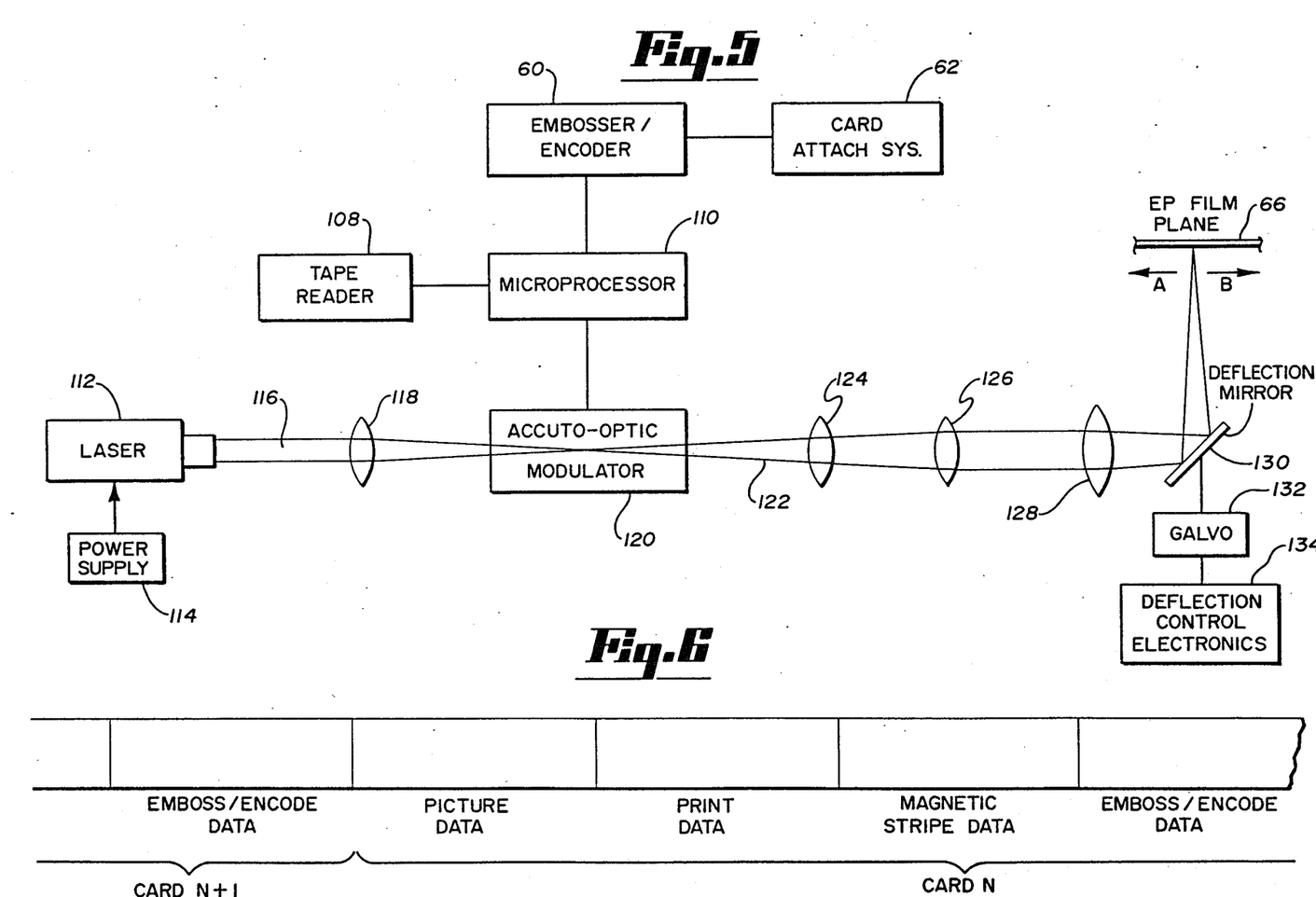
FIG. 5 is a right side elevational view depicting, partially in block format, the components of the exposure station of FIG. 3 and their connection to a microprocessor and an encoder.
FIG. 6 is an illustration of the format of the data on the magnetic tape which may be employed as the semi-permanent storage 36 of FIG. 1.

Referring to FIG. 6, the data stored on the magnetic tape for each card to be manufactured may include digital image (i.e. picture) data and print data. Magnetic stripe data and emboss/encode data may also be included if state of the art magnetic stripe coding circuitry or card embossing modules are added to the machine. The print data, emboss/encode data and magnetic stripe data are transmitted to an embosser/encoder module 60 (indicated as a block on FIG. 5). Thus, in an alternate embodiment, the system of the present invention may be operated "inline" with an embossing module from any automatic embossing system. For example, the system of the present invention may be operated "in line" with the Data Card Series 4000 embosser/encoder module described in U.S. Pat. No. 4,088,216, assigned to the assignee of the present application, the disclosure of which is hereby incorporated by reference; or the Data Card Series 1500 embosser described in U.S. Pat. No. Re 27,809, assigned to the assignee of the present application, the disclosure of which is hereby incorporated by reference. In its presently preferred embodiment, the system of the present invention may be used as a stand-alone system to fully image a card with alphanumeric data, picture(s), signature(s) and the like.

Image Applying Module

Figure 3:
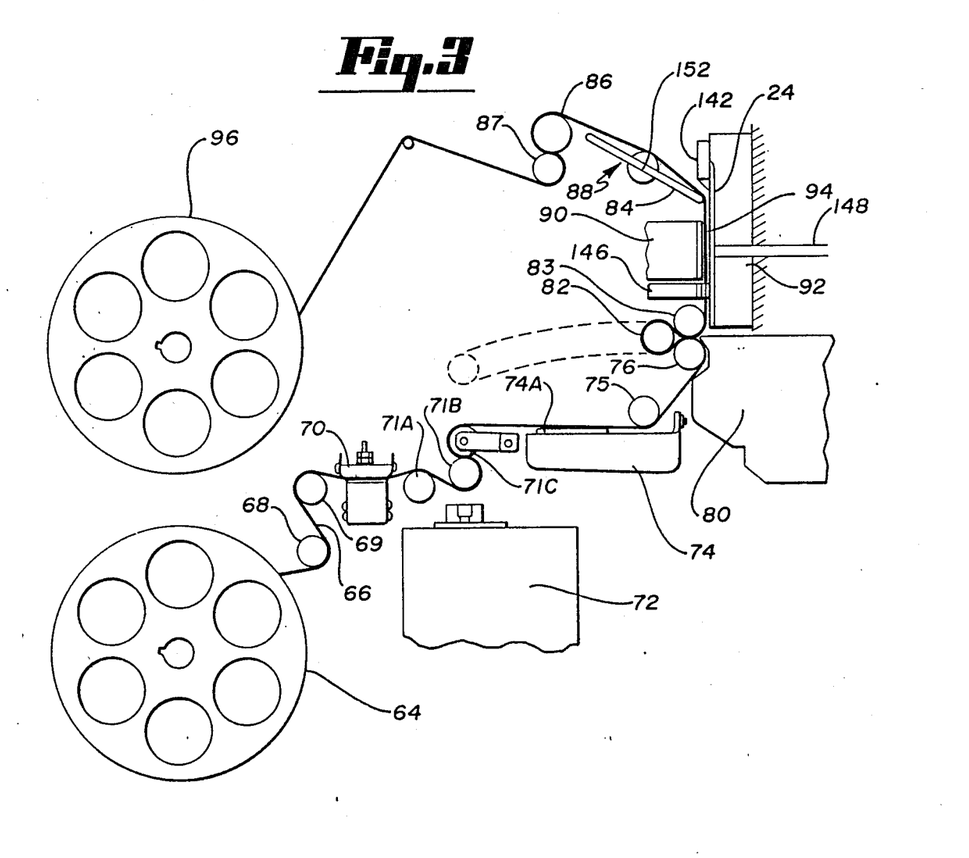
FIG. 3 is a right side elevational view of the electrophotographic film path in schematic form depicting a sensitizing station, an exposure station, a toning station, a drying station and a transfer station in accordance with the system of the present invention.

FIG. 3 is a right side elevational view of the overall image generating and transfer subsystem of the present invention. A supply reel 64 holds a roll supply of an electrophotographic medium 66 which in the preferred embodiment is electrophotographic film. The electrophotographic film 66 is drawn around guide rollers 68 and 69 and past a sensitizing station comprising a corona generator 70 for placing a charge on the surface of the electrophotographic film 66. The charging operation is performed in a lighttight enclosure. After charging, the film is sensitive to light and remains in the lighttight enclosure until it is toned and dried.

The sensitized film 66 is transported over rollers 71A, 71B and 71C past a laser scanner or exposure station 72 and a toning station 74. The exposure station 72 generates a modulated laser beam which is electronically scanned across the sensitized electrophotographic film 66 to form a selected pattern of dots to produce a latent electrostaic image on the film 66. As the film 66 is transported past the toning station 74, charged toner is attracted to the portions of the film 66, so that a toner image is formed on the film 66. The toner contains positively charged carbon particles and adhesive material suspended in a kerosene-like fluid. The exposed film 66 passes over toning station 74 and comes into contact with the toner which flows up through a hole in toner head 74A. The carbon particles are attracted to the dots or discharged areas which the laser has written onto the film.

After the toning step, the film is dried in a drying station 80 which blows a stream of air across the surface of film 66 to remove excess toner and dry the toned image. After the film is dried, it is no longer sensitive to light.

The film 66 is transported over rollers 75 and 76 around a roller 82 which is spring biased to serve as a dancer and to form a buffer loop, which provides a flexible film interface between the image development portion of the system which may be mounted on a single subassembly, which operates at substantially constant film velocity, and the image transfer portion of the system which is mounted on a separate frame and which operates with incremental motion. A further roller 83 and a rocker arm 84 are employed to a position the toner image carrying film 66 in a transfer station 90. Rocker arm 84 is incrementally rotated clockwise at the completion of the image transfer operation to allow the force of roller 86 and idler 87 to strip the film from the card while the toner image remains. The transer station 90 comprises a card back up block 92 and a heated platen 94 which are shown in more detail in FIGS. 8 through 12. After the film is transported through the transfer station 90 and the toner image is transferred from the film 66 to the card 24, the film 66 is transported to a take up roll 96 where it is stored for disposal.

Sensitizing Station

Figures 4, 9, 10:
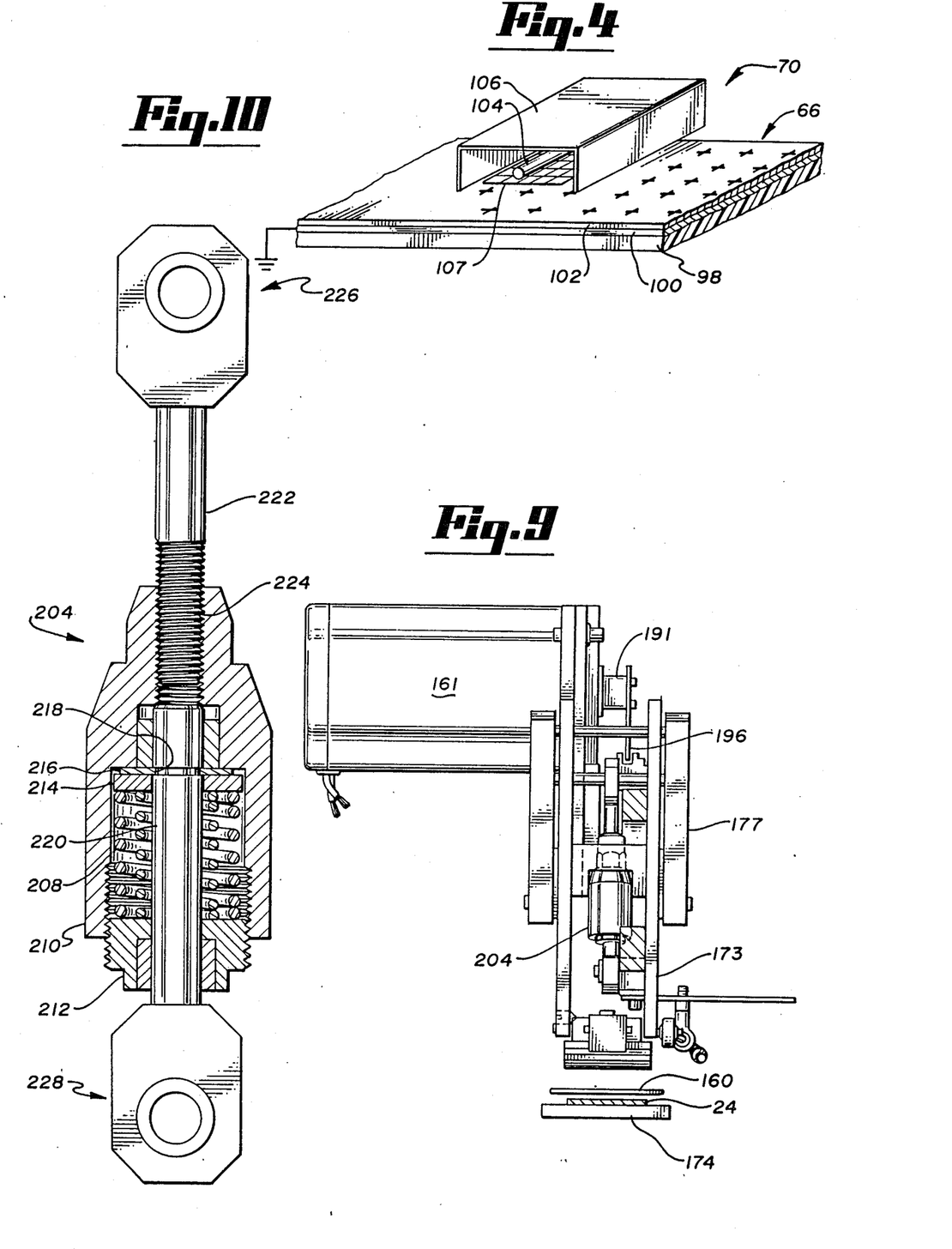
FIG. 4 is a perspective view of the sensitizing station of FIG. 3.
FIG. 9 is a right side elevational view in section taken along line 2—2 of FIG. 1.
FIG. 10 is a detail view of a spring link with parts shown in cross-section across the long axis.

Referring to FIG. 4, the electrophotographic film 66 and the sensitizing station 70 will be described. As noted above, in the preferred embodiment, the electrophotographic medium 66 comprises electrophotographic film 66. The electrophotographic film 66 comprises a support base 98, a thin conductive layer 100 which is grounded to the film spool 64 (shown in FIG. 3) and a photoconductive layer 102 which has a high dark resistance. The corona generator 70 comprises a thin tungsten wire 104 and a conducting enclosure 106. The film 66 is sensitized (i.e., made light sensitive) by applying a voltage of 5,000 to 7,000 Vdc to the wire 104 relative to the enclosure 106. This high voltage causes the surrounding air to ionize, thereby causing positive ions to be attracted to the photoconductive layer 102 of the film 66. A control grid 107 acts as a valve for the in-flow and assures a uniform charge distribution. The surface 102 of the film thus acquires a change of 400–600 Vdc relative to its conductive middle layer 100. The corona generator 70 places a uniform electrostatic charge on the surface of the film 66 in a light-free enclosure.

Exposure Station

Referring to FIG. 5, the exposure station 72 of FIG. 3 will be described. The exposure station 72 may be directly connected to the data acquisition subsystem illustrated in FIG. 1. Alternatively, digital image data and alphanumeric data can be stored on magnetic tape at a remote location (using the data acquisition subsystem of FIG. 1) and the magnetic tape can then be transported to a location for manufacturing a plurality of cards 24. In the preferred embodiment, the data acquisition subsystem of FIG. 1 is employed to store digital image data and alphanumeric data for a plurality of subjects 22. The stored digital image data and alphanumeric data may then be transported (e.g., either physically, as a magnetic tape or disk, or over phone lines) to a site having facilities for manufacturing cards where the information stored on the magnetic tape is read by a tape reader 108. Thus, the tape reader 108 provides both alphanumeric data and digital image data to a microprocessor 110 which in turn may provide the alphanumeric data to the embosser/encoder 60 while it supplies the digital image data to the exposure station 72. In the embodiment of the present invention in which the data acquisition subsystem of FIG. 1 is used to read the magnetic tape during the card forming process, the separate microprocessor 110 and tape read 108 are not required since the microprocessor and memory 32 and the semipermanent storage 36 can perform these functions.

The exposure station 72 comprises a laser 112, powered by its own power supply 114, for generating a coherent light beam 116, hereinafter referred to as laser beam 116. A beam compressor lens 118 compresses the laser beam 116 and feeds the laser beam 116 to an acousto-optic modulator 120. The acousto-optic modulator 120 is connected to the microprocessor 110 to receive the digital image data. The acousto-optic modulator 120 digitally modulates the laser beam 116, in accordance with the digital image data, to generate a modulated laser beam 122 which is passed through a pair of beam expander lenses 124 and 126 and an objective lens 128. The beam expander lenses 124 and 126 expand the modulated laser beam 122 to achieve smaller spot sizes at the plane of the film 66. The modulated laser beam 122 passes from the objective lens 128 to a deflection mirror 130 which is oscillated by a galvanometer 132 under the control of deflection control electronics 134. Thus, the modulated laser beam 122 is scanned back and forth across the plane of the film 66 in the directions of the arrows A and B in FIG. 5.

Figure 13A:
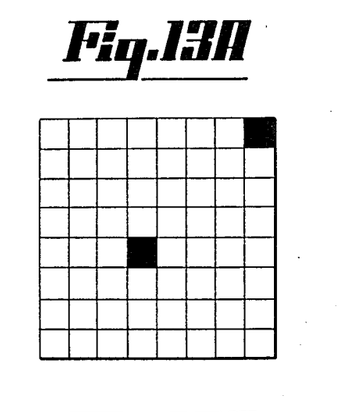
FIGS. 13A through 13E are views of pixels showing the grey scale tone pattern used in the system.
Figure 13B:
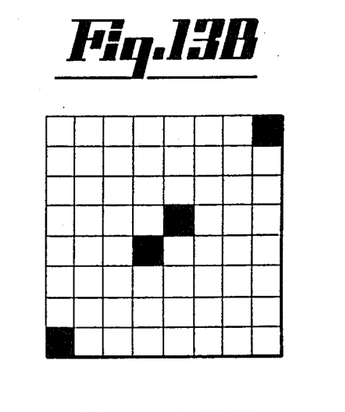
Figure 13C:
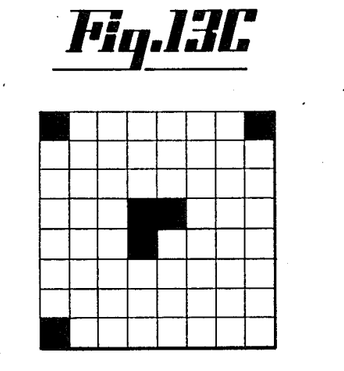
Figure 13D:
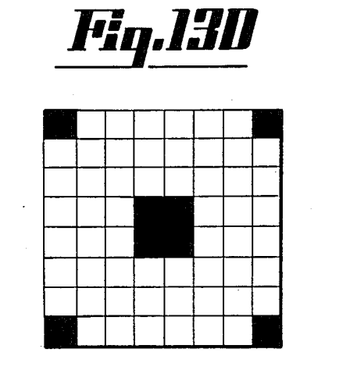
Figure 13E:
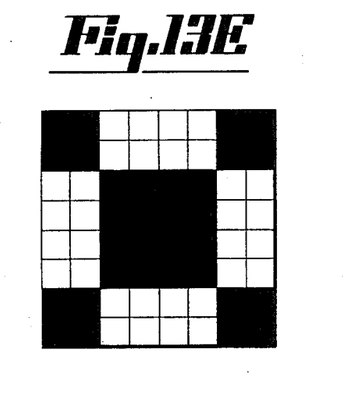

By scanning the modulated laser beam 122 across the sensitized electrophotographic film 66, the impingement of the laser beam 122 upon the photoconductive layer 102 causes the positive ions which are attracted to the surface of the photoconductive layer 102 to be conducted to the thin conductive layer 100. thus, a latent electrostatic image is formed on the surface of the photoconductive layer 102. This image requires an exposure time of approximately one second, depending upon image size. The image is broken down into 15,625 pixels per square inch, each pixel being 8 mils square with 64 possible dot locations. A varying grey scale is achieved by selectively exposing the dot positions within each pixel. A grey scale with a resolution of 32 increments between black and white can be defined with a five-bit word. The grey lines are built up within a pixel by adding two black elements to the pixel for each increment. For best effect, the added elements are diagonally separated from each other, as shown in FIGS. 13A through 13E. FIGS. 13A through 13D show the first through fourth grey scales, respectively, while FIG. 13E shows the 16th grey scale where half of the elements are filled. The pattern selected gives a uniform aesthetic appearance where adjacent pixels have the same grey level. The very regular pattern used in implementing the grey scale increases the overall security of cards produced by the machine, making the pictures difficult to alter, forge or duplicate.

Figure 14:
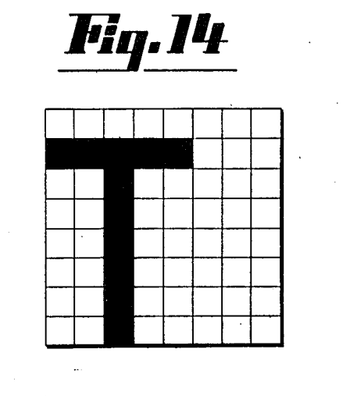
FIG. 14 illustrates the insertion of micrographics characters in a typical pixel.

The system is also useful for applying micrographic characters and graphics within certain pixels. Alphanumeric micrographics can be placed within a 5×7 dot matrix located within an 8×8 element pixel. FIG. 14 shows the letter "T" in micrographic form within a pixel. Substitution of micrographic coding data for grey scale data for selected pixels can be readily accomplished within the data acquisition terminal.

Although the micrographic characters are quite small, they can be read using a hand magnifier. The use of micrographics can greatly enhance the security of cards produced on the machine. For example, the micrographic characters can be linked to other data appearing on the card so that alteration of the card can be readily detected by comparing the micrographic images to other data.

One example of an enhanced security card is one which bears a photograph of the owner, together with account number and address information. Both the photograph and the data can be converted to digital grey scale levels for a plurality of pixels. The photo is placed on the card by applying coded dots and the alphanumeric data may also be applied by forming a digital image of the alphanumeric characters and applying those characters to the card using the present machine. Security may be enhanced by including a micrographic character as a single pixel of each macrographic alphanumeric character. In a typical situation, the micrographic character would correspond to the macrographic character, although other, more complicated relationships between the macrographic characters and the embedded micrographic codes could be used.

It is also possible to reproduce the entirety or part of the macrographic data as micrographic data in another location on the card. For example, the name ofthe bearer of the card could be embedded micrographically in the photo portion of the card by substituting the micrographic characters for the photo grey scale data. Because the printing data is all stored in memory before being applied, it is relatively simple to substitute a micrographic pixel for a pixel carrying image grey scale information.

Toning Station

In the preferred embodiment, the electrophotographic film 66 is Ektavolt 50–107 electrophotographic film and the toner which is used to tone the film is Kodak MX-1125 liquid toner. As the electrophotographic film 66 is transported past the toning station 74, the toner (which is positively charged in the preferred embodiment) is only attracted to the areas of the photoconductive layer 102 which have been exposed by the modulated laser beam 122. Thus, a toner image 136 (FIG. 7) is formed on the surface of the electrophotographic film 66.

Image Transfer

Referring to FIGS. 3 and 8 through 12, the transfer of the developed toner image 136 to the card 24 at the transfer station 90 will be described. The heated platen 94 includes a contact area 138 having dimensions which are substantially the same as the toner image 136 which is to be transferred to the card 24. This contact area 138 (and hence the image 136) may be any desired size and, for example, may be of a size to occupy the upper right hand corner of the card 24. Of course, multiple transfer steps can be used to apply, for example, a photo which can be applied to the left-side of a card and macrographic printing which can be applied to the right side. The card back up block 92 is fixed to a support 140 and includes card guides 142 (shown in FIG. 3) for confining card 24 against the surface of the card back up block 92. Driven rollers 146 are employed to transport the card 24 into an image transfer position on the card back up block 92 and a vacuum conduit 148 (shown in FIG. 3) is selectively actuated to secure the card in position against the card back up block 92. Once the card 24 has been transported into an image receiving position by the driven rollers 146 and the film 66 carrying the toner image 136 has been transported into a position for transfer, the heated platen 94 is moved generally toward card 24 so that the curved contact area 138 of the heated platen 94 presses against the support base 98 of the electrophotographic film 66, thereby pressing the toner image 136 into bonding contact with the card 24. The platen 94 is rolled across this contact position in a predetermined period of time and is then generally withdrawn from the card.

Figures 7, 8:
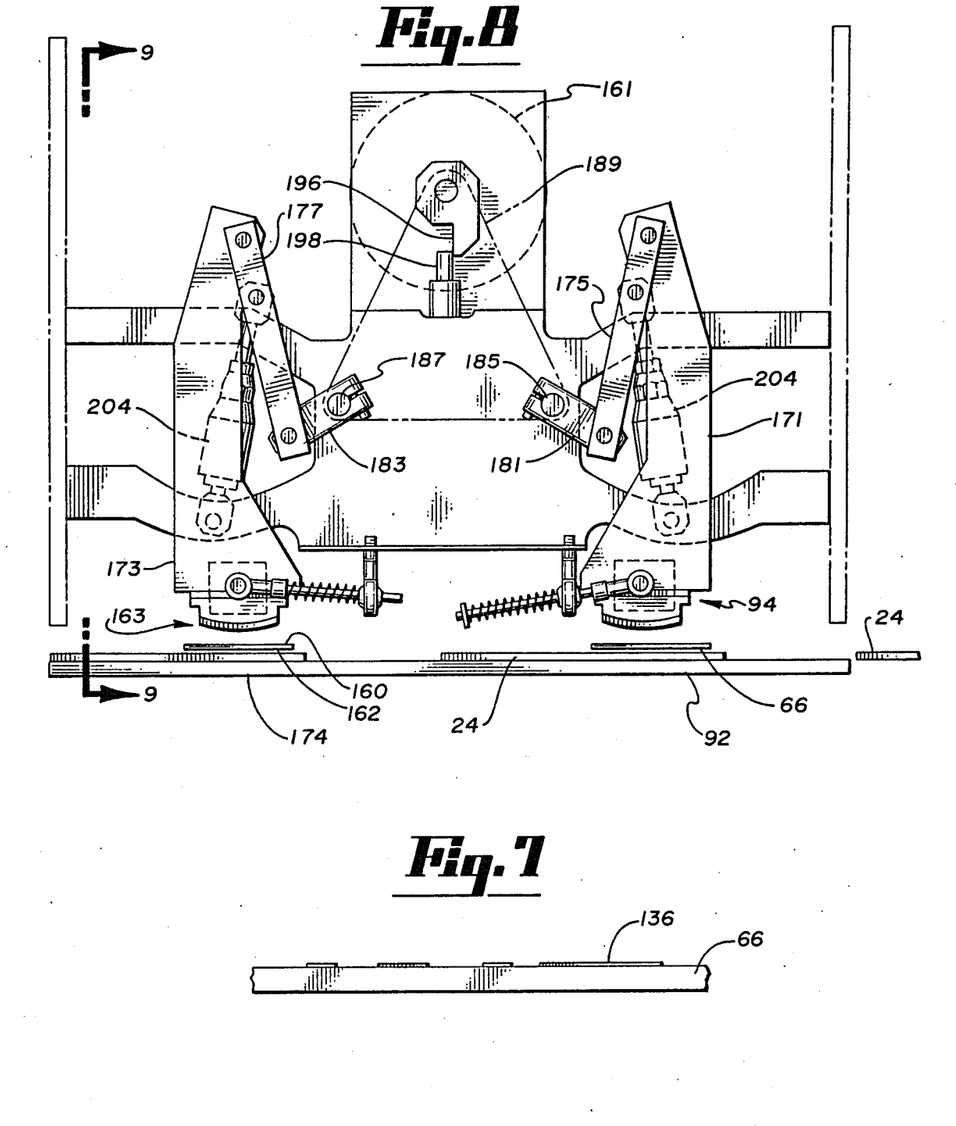
FIG. 7 is a right side elevational view illustrating a toner image 136 on the electrophotographic film 66.
FIG. 8 is a front elevational view with the transfer mechanism at 0°/360° in the transfer cycle and some parts omitted for clarity.
Figure 11:
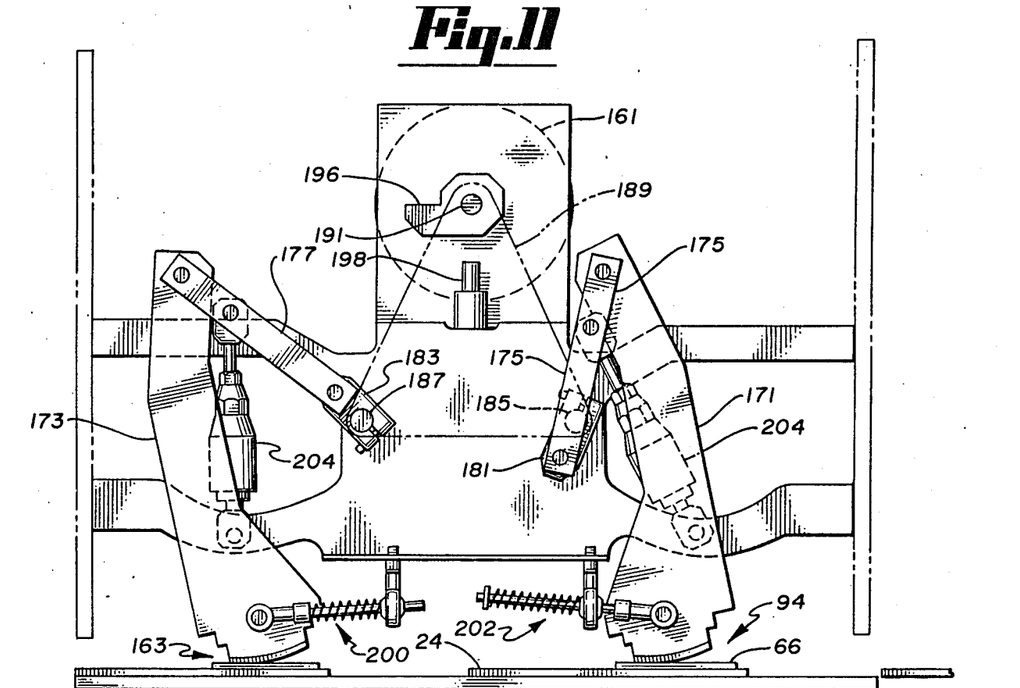
FIG. 11 is a front elevational view with the transfer mechanism advanced.
Figure 12:
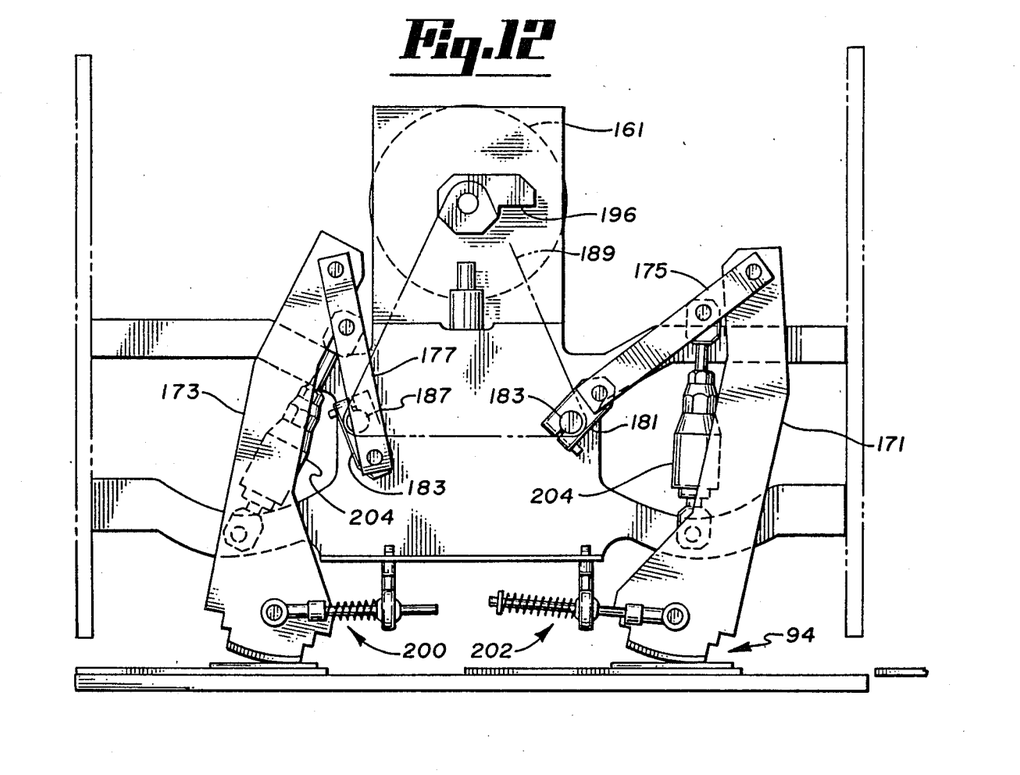
FIG. 12 is a front elevational view with the transfer mechanism further advanced.

FIGS. 8 through 12 show the platen 94 and its movement and mechanism in more detail than the schematic shown in FIG. 3. FIGS. 8, 11 and 12 are views of the card transfer mechanism 90 taken from below as the unit is oriented in the preferred embodiment. It will, of course, be appreciated that the unit could be operated equally well in a number of other orientations.

Platen 94 has a curved surface to facilitate a rolling transfer of the tranfer image from film 66 onto card 24. The use of a platen having a curved surface which is rolled across the transfer area presents definite advantages over embodiments which employ a flat platen, as well as over embodiments using a roller platen. The rolling transfer requires a smaller force on the platen to accomplish the transfer than does a flat platen. If a flat platen were used, it would have to have a crowned area at the center to force air from under the film at the time is it applied to the card and would, therefore, require the application of significant pressure to the platen to compress the platen. Typically, about 500 psi are required to be applied to the flat platen to accomplish an adequate transfer. By using a rolling curved platen, air is not trapped between the film and the card because of the rolling action. Since only a small part of the width of the platen is in contact with the card and film at any one time, a much smaller force is requird to be applied by the platen. Approximately a 50-pound force is all that is required to make an adequate contact. Movement of the platen into contact with the film and card from a retracted position, as well as the transfer movement, is accomplished with a unique four-bar linkage.

The use of a flat platen would require the entire platen to be in contact with a card or film for a given dwell time. This results in a relatively long time required to bring the platen back up to an adequate temperature for the next operation. For the same operating speed, use of a rolling plate permits reduction of the heater capacity used to heat the platen from 600 watts to 200 watts and permits relatively higher cycle time. A full roller platen would also require substantial heater energy to cover the full area.

A further disadvantage of the use of a flat platen is that its crowned rubber surface requires the use of relatively thick rubber in the neighborhood of 0.08 inches and the use of that thick rubber pad requires a long recovery time between cycles. The rolling method permits the use of a thinner rubber surface 138 because no crown is required. In the preferred embodiment shown, the thickness of the rubber surface 138 is 0.03 inches.

The rolling is accomplished by using a four-bar linkage onto which the platen is attached. In many respects, the platen resembles a segment of a roller, but its particular operating characteristics give it advantages over both conventional roller platens and flat platens.

A motor 161 is used to drive the platen 94 used to imprint the toner image on the card and a similar platen 163 which is used to bond a protective film coating 160 to the card after the toner image is applied. The film applying platen 163 has a rubber surface 165 corresponding to surface 138 of the image applying platen 94. Block heaters 167 and 169 are shown as heating the image and protective film platens, respectively. the heater blocks 167 and 169 are, in turn, mounted on heater block arm assemblies 171 and 173, respectively. Those arm assemblies are connected to coupler arm links 175 and 177, respectively. Links 175 and 177 are pivotally connected to crank arms 181 and 183, which are, in turn, rotatably mounted on shafts 185 and 187, which are driven by a timing belt 189 which is, in turn, driven by the shaft 191 of motor 161. As shown in the view of FIG. 9, each platen is supported by a pair of heater block assemblies, such as 171 and 173, which are located on both sides of a frame plate 194. FIG. 8 shows both platens in the retracted position and the shaft 191 of motor 161 in the reference position. A flag 196 and a photocell sensor 198 serve to provide an electrical signal indicative of the reference position of shaft 191 for the control electronics which are not specifically shown.

FIG. 11 shows shaft 191 rotated 90 degrees clockwise from the position shown in FIG. 8. In this position, it can be seen that the left-hand edge of platens 163 and 94 have been brought into contact with the surface of protective film 160 and image bearing film 66, respectively, and begun the rolling process. A lost motion link 200 stabilizes movement of the protective film platen 163 while a lost motion link 202 stabilizes the motion of image transferring platen 94. In order to apply a proper and controllable amount of force between the platen and the film and card surfaces, identical spring links 202 and 204 are used. The structure of links 202 and 204 is illustrated in more detail in FIG. 10. As shown in that Figure, a pair of concentric compensation springs 208 is enclosed in a chamber within a body 210 which is closed at one end by a nut cap 212 which is threaded to engage the inner wall of the cavity of body 210 within which springs 208 are enclosed. The other end of the inner chamber has a washer 214 and a snap ring 216 which engages a circumferential slot 218 in a central shaft 220. An adjustable shaft 222 is threadably inserted into a threaded opening 224 of body 208. An upper spring link pivot 226 is connected to shaft 222 while a lower spring link pivot.228 is connected to shaft 220. As shown in FIGS. 9, 11 and 12, spring links 204 are pivotally connected between frame 194 which is connected to the lower spring link pivot point 228 and the coupler arm 175 or 177 of the appropriate platen assembly. As motor 161 rotates from the position shown in FIG. 11 to that shown in FIG. 12 and the rolling platens 163 ad 94 roll across the surfaces of the cards, spring links 204 maintain a constant pressure between the platen and the card face. The amount of pressure can be adjusted by varying the compression of springs 208 enclosed within the spring links 204 by advancing nut cap 212 further into the body portion 210 or withdrawing it from the body portion 210 to reduce the spring pressure. The length of link 204 can be adjusted by rotating shaft 222 to advance that shaft further into body portion 210 or withdrawing it from body portion 210. Adjustment of the spring force is, therefore, independent of the adjustment of the length of the link 204.

As motor 161 is driven, one edge of both platens engages the film and card "sandwich" (as shown in FIG. 11) and is rolled across the face of the card as motor 161 continues to rotate until reaching the position shown in FIG. 12. As motor 161 continues to rotate, it disengages the platens from the film and cards and pulls them away from the surface to the position shown in FIG. 8. During the period of time when the platen is in contact with the film and card, the spring link 204 is extended and applies a force to the platen of approximately 50 pounds which is then translated to a pressure applied by the curved surface of the platen to approximately 500 psi on the card and film interface.

The four-bar linkage of the spring loaded link 204, the crank arms 181 and 183, the coupler arms 175 and 177, the heater block assemblies 171, 173, and the spring links 204 have a number of features which provide improvements over a flat or crowned platen moved against the card and film and removed from the card and film. The particular characteristics of the four-bar linkage make for a linear relationship between the rotational input of the shaft 191 of motor 161 and the rotation of the curved platens 163 and 94 across the face of the card and film. The linkage also has the characteristic of providing a rapid return of the platen from the impressing position. Approximately 60 percent of the total revolution of the motor shaft occurs as the platen is rolled across the face of the card, while the other 40 percent accomplishes all of the remaining movements of the platen toward and away from the film and card to permit the film to be stripped from the card. As the four-bar linkage moves from the position shown in FIG. 11 to the position shown in FIG. 12, the path traced by the pivot point between the coupler arms 175 and 177 and the heater block assembly arms 175 and 176 is very close to a straight line so that there are only small changes in the spring forces inside the spring link 204 throughout the entrie traverse of the card face.

In order to achieve the desired transfer of the toner image 136 to the card 24, it is necessary to hold the card 24 flat while the electrophotographic film is pulled away in a peeling motion. The peeling motion creates a very high stress at the interface of the peeled material (i.e., the electrophotographic film 66) with the toner. Since the toner is fused by the heat and pressure generated by the contact area 138 of the platen 94, and because of the elastic properties of the fused toner, the stress diminishes through the toner layer to the card 24. Thus, any break or separation will occur at the point of the highest stress, which is the point at which the electrophotographic film 66 and the toner image 136 interface.

As best seen in FIG. 3, the transfer station 90 is adapted to peel the electrophotographic film 66 from the card 24 and toner image 136. When the heated platen 94 is in the engaged position illustrated in FIGS. 11 and 12, the electrophotographic film 66 follows a path parallel and adjacent to back plate 92. Roller 88 is connected to a link 84 which pivots about a pivot point 152. Once the heated platen 94 has been retracted from its transfer position, the film guide 84 is pivoted about pivot point 152 by a solenoid not explicitly shown so that guide 84 is moved to a position so that the rollers 86 and 87 pull the film 66 away from the back plate as the electrophotographic film 66 is transported around rollers 86 and 87. A peeling motion is generated, thereby peeling the electro- photographic film 66 from the toner image 136 which remains fused to the card 24. After the peeling process is completed, the solenoid is deenergized and guide 84 pivots back to the position illustrated in FIG. 3 and the cycle is repeated for the next image.

The particular heat, pressure and dwell times employed in the transfer process illustrated in FIGS. 3 and 8 through 12 will vary in accordance with the requirements of a particular application. Thus, it is only necessary that the heat, pressure and dwell time be sufficient to release the toner from the film and fuse it to the surface of the card 24. Typically, the roller is maintained at approximately 430° F.±15° F. and develops 360 to 500 psi pressure on the card-film interface while rolling a 1-inch wide image in about a one second traverse time.

The heated transfer platen 94 of the present invention provides significant advantages over prior art image transfer devices such as heated rollers. In the present invention, no visible heat marks remain on the card in areas other than the image area, so that the surface finish of the remaining portions of the card 24 remains intact. In addition, the card 24 may be embossed and/or encoded prior to image transfer since the platen 94 presses only on those portions of the card 24 which are to receive the image 136. Thus, the platen 94 will not damage any prior embossing, nor will it damage any sensitive surfaces such as magnetic stripes which are frequently placed on the back of the card 24.

While the toner image 136 which is transferred to the card 24 is stable and durable, in the preferred embodiment a protective layer is placed over the image 136 in order to make the image more able to withstand the abrasion and chemicals present in the wallet environment. Referring to FIGS. 8, 9, 11 and 12, a protective layer transfer station which is similar to the transfer station 90 is illustrated. A carrier film 160 carries a plurality of thin thermoplastic coatings 162 which may be approximately the same size as the toner image 136 which is transferred to the card 24. Of course, the coating may be applied to the entire face of the card, if desired.

No dancer is required in the protective film applying assembly because the protective film may be continuously supplied. The path of the carrier film 160 is defined by roller 164 and pick-up rollers similar to those used on the electrophotographic film 66. A heated platen 163 includes a contact surface 166 for contacting the carrier film 160 on the side opposite the thermoplastic coating 162. A card back up block 174 mounted on a support 176 is shown in FIGS. 8, 11 and 12. It includes upper and lower card guides and a vacuum conduit 182 analogous to those shown in FIG. 3 for the image transfer station 90. Driven rollers not specifically shown are actuated to transport the card 24 through the protective layer transfer station 158. The heated platen 163 is actuated in the same manner as the heated platen 94 in the transfer station 90. Similarly, the take-up roller is connected to a link 186 which is pivoted by a solenoid not shown so that the carrier film 160 is peeled from the thermoplastic coating 162 in the same manner in which the electrophotographic film 66 is peeled from the card 24. In the preferred embodiment, the thermoplastic coating 162 is 150 millionths of an inch thick and the carrier film 160 is 2 mils thick. To produce an acceptable thermoplastic film transfer to the card 24, a preferred minimum pressure of 160 psi and a platen temperature of from 320° F. to 420° F. is applied to the film. Again, it will be realized that the force actually applied to the station 163 will not need to be this large to generate these pressures to the portion of the card surface contacted by the rolling platen.

The operation of the system will now be described with reference to FIGS. 2, 3 and 5.

In general, it is desirable to store digital image data and corresponding alphanumeric data for plural cardholders on a magnetic tape, so that a large number of cards 24 may be produced at a single time by inputting the data into a card forming and processing system. In order to capture and store the images as digital image data and to store the alphanumeric data, the video camera 20 takes a picture of each cardholder 22, and the picture is then digitized by the video digitizer circuit 26 and sent to the graphics memory and refresh control circuit 28. The image which is captured by the camera 20 is displayed on the CRT display 30 and the digital image data is transferred from the graphics memory and refresh control circuit 28 to the microprocessor and memory 32. Similarly, alphanumeric data is input to the microprocessor and memory 32 via the keyboard 34. The alphanumeric data may also be displayed on the CRT display. When an operator views the desired image on the CRT display 30 and the desired alphanumeric data has been input from the keyboard 34, the corresponding digital image data and alphanumeric data are stored in the microprocessor and memory 32 and are then transferred to the semi-permanent storage 36. As noted above, it is preferred to store the alphanumeric data and digital image data for a large number of cardholders 22 on the semi-permanent storage 36.

When it is desired to encode a card and form an image on the card, the tape reader 108 reads the alphanumeric data and digital image data from the semi-permanent storage 36 (e.g., magnetic tape) and transmits this data to the microprocessor 110. The microprocessor 110 sends the alphanumeric data and the digital image data to the acousto-optic modulator 120 which is a part of the exposure station 72. The electrophotographic film 66 is transported past the sensitizing station 70 where the electrophotographic film 66 is uniformly charged. The charged electrophotographic film 66 is transported past the exposure station 72 where the modulated laser beam 122 (modulated in accordance with the digital image data) is scanned across the charged electrophotographic film 66 by the deflection mirror 130, so as to selectively discharge portions of the electrophotographic film 66 in accordance with the digital image data received by the acousto-optic modulator 120. The digital image data can, of course, be modified by substituting micrographic code bearing pixels based upon the alphaumeric data which characterizes the card or general micrographic data which may be applied to a particular area of all images.

Once the electrophotographic film 66 has been scanned by the modulated laser beam 122, the film 66 carries a latent electrostatic image. The selectively discharged electrophotographic film 66 is transported past a toning station 74 where charged toner is attracted to the discharged portions of the electrophotographic film 66, so that the toner image 136 (FIG. 7) is formed on the electrophotographic film 66. The electrophotographic film 66 is transported past the drying station so as to remove any loose toner from the toner image 136, and is subsequently transported to a position in between the heated platen 94 and the card 24 which is supported by the card back-up block 92.

The toner image 136 is pressed against the card 24 by the platen 94 to transfer the toner image 136 to the card 24. The electrophotographic film 66 is then peeled away from the card 24 so that the toner image remains intact on the card 24.

A similar process can then be followed to print the alphanumeric data on another location on the face of the card.

The card 24 carrying the toner image 136 is then transported to the protective layer transfer station 158 where the thermoplastic coating 162 is transferred to the card 24 to protect the toner image 136 from degradation due to the abrasion and chemicals in a wallet environment.

The protective layer may be applied to both the image and the alphanumeric data separately or, in an alternate embodiment, may be applied to the entire face of the card. Similarly, the electrophotographic medium 66 may be charged or discharged in any desired manner, with the corresponding charged toner (i.e. positive or negative) being used to tone the charged or discharged areas. The values of heat, pressure and dwell time employed to transfer the toner image 136 to the surface of the card 24 may be varied in accordance with the requirements of a particular application. Further, although the card used in the above experiments was composed of polyvinyl chloride, the card 24 may be made of any suitable material to which the toner can be fused.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation. shown and described, and accordingly all suitable modifications and equivalents may be resorted to, falling within the scope of the invention.

What is claimed is:

1. A method of applying an array of macrographic and micrographic characters to a surface comprising the steps of:
    (a) generating a digital image from the array of data wherein the macrographic data is represented by a plurality of pixels to define a varying grey scale image and the micrographic data includes alphanumeric characters in one pixel;
    (b) modifying the digital image by replacing at least one pixel in the digital image with micrographic data pixels; and (c) applying the digital image in visible form to the surface.

2. The invention of claim 1 wherein the micrographic character embedded in a particular macrographic character corresponds to that macrographic character.

3. The invention of claim 1 wherein the entirety of macrographic alphanumeric characters are reproduced in micrographic and both macrographic form on the card.

4. The invention of claim 1 wherein the macrographic data includes a picture printed on the card having certain pixels wherein the picture data is replaced with micrographic characters.

5. The invention of claim 4 wherein the micrographic security data corresponds to the alphanumeric macrographic data.

6. A system for applying data to a card, comprising:
(a) an electrophotographic medium;
(b) a light source for generating a coherent light beam;
(c) electronic means for receiving and storing a digital image signal in a plurality of memory locations corresponding to pixels of a macrographic digital image;
(d) means for altering the digital image signal by replacing digital image data from selected pixels thereof with pixels representative of micrographic data to form a modified digital image signal having micrographic data embedded within a macrographic data image;
(e) modulation means operatively coupled to the electronic means and positioned in the path of the coherent light beam for modulating the coherent light beam in accordance with the modified digital image signal;
(f) scanning means for scanning the modulated coherent light beam across the electrophotographic medium to selectively expose the electrophotographic medium and form a latent image thereon in conformance with the modified digital image;
(g) toner applying means for applying a toner image on the electrophotographic medium; and
(h) transfer means for transferring the toner image to a predetermined portion of the card through heat and pressure thereby forming a visible data array thereon having micrographic data pixels embedded at predetermined locations of the macrographic digital image.

7. The invention of claim 6 wherein the macrographic data is a photographic image and the micrographic data is comprised of alphanumeric characters.

8. The invention of claim 7 wherein there is one alphanumeric character in each pixel of the micrographic data.

9. The invention of claim 6 wherein the macrographic data comprises alphanumeric characters comprised of a plurality of pixels and the micrographic data is comprised of alphanumeric characters.

10. The invention of claim 9 wherein the micrographic data has one alphanumeric character in each micrographic pixel.

11. The invention of claim 10 wherein one micrographic pixel is embedded in each alphanumeric character of the macrographic data and the alphanumeric character of the pixel of micrographic data bears a predetermined relationship to the alphanumeric character in which it is embedded.

12. The invention of claim 11 wherein the alphanumeric characters of the macrographic data have embedded therein a pixel of micrographic data containing the same alphanumeric character.

* * * * *